(12) United States Patent
Walker

(10) Patent No.: US 8,276,507 B1
(45) Date of Patent: Oct. 2, 2012

(54) TWO-PIECE HANDLE DESIGN FOR PRESSURE COOKER

(75) Inventor: Shane R. Walker, Eau Claire, WI (US)

(73) Assignee: National Presto Industries, Inc., Eau Claire, WI (US)

( * ) Notice: Subject to any disclaimer, the term of this patent is extended or adjusted under 35 U.S.C. 154(b) by 456 days.

(21) Appl. No.: 12/617,362

(22) Filed: Nov. 12, 2009

Related U.S. Application Data

(60) Provisional application No. 61/113,469, filed on Nov. 11, 2008.

(51) Int. Cl.
- *A47J 27/08* (2006.01)
- *A47J 27/00* (2006.01)
- *B65D 51/16* (2006.01)
- *B65D 45/00* (2006.01)

(52) U.S. Cl. ......... 99/337; 99/403; 220/316; 220/573.1; 220/912; 16/110.1; 16/406; 16/425; 16/DIG. 24; 16/DIG. 41

(58) Field of Classification Search ............... 99/337, 99/403; 219/440; 220/316, 573.1, 912, 759, 220/769, 318, 752, 762; 16/422, 425, 426, 16/110.1, 406, 413, DIG. 24, DIG. 25, DIG. 41; D07/393, 395

See application file for complete search history.

(56) References Cited

U.S. PATENT DOCUMENTS

| | | | |
|---|---|---|---|
| 2,217,369 A * | 10/1940 | Battistone et al. | 16/422 |
| 2,424,125 A * | 7/1947 | Sieling | 215/235 |
| 2,595,361 A * | 5/1952 | Keating | 220/753 |
| 3,108,316 A * | 10/1963 | Peale | 220/759 |
| 4,103,801 A | 8/1978 | Walker | |
| 4,143,787 A | 3/1979 | Walker | |
| 4,162,741 A | 7/1979 | Walker et al. | |
| D253,388 S | 11/1979 | Boldt et al. | |
| D253,746 S | 12/1979 | Boldt et al. | |
| D253,867 S | 1/1980 | Boldt et al. | |
| D254,769 S | 4/1980 | Boldt et al. | |
| 4,434,909 A * | 3/1984 | Ott | 220/316 |
| 4,794,666 A * | 1/1989 | Kim | 220/753 |
| 4,932,550 A * | 6/1990 | Moucha | 220/203.09 |
| 6,920,820 B2 * | 7/2005 | Meggison et al. | 99/422 |

OTHER PUBLICATIONS

Product Bulletin, Presto® 6-Quart Electric Stainless Steel Pressure Cooker, 2009, 1 page.
Product Bulletin, Presto® 4-Quart Aluminum Pressure Cooker, 2009, 2 pages.

(Continued)

*Primary Examiner* — Reginald L Alexander
(74) *Attorney, Agent, or Firm* — Patterson Thuente Christensen Pedersen, P.A.

(57) ABSTRACT

An improved pressure cooker design including a two-piece handle utilizing a common connection point to a cover to increase resistance to damage due to over tightening of connecting screws while simultaneously allowing the use of a conventional handle size with a reduction in overall packaging size. The two-piece handle design includes a cover base portion and a cover grip portion wherein a pair of nuts are mounted within the cover base portion to receive coupling screws at both ends of the nuts for joining the cover and the cover grip portion to the cover base portion. Tightening of the coupling screws provides for continuous metal on metal contact eliminating damage to weaker polymeric materials while allowing a consumer to quickly and easily attach the cover grip portion of the two-piece handle to the cover base portion at a point of use so as reduce overall packaging dimensions.

9 Claims, 8 Drawing Sheets

OTHER PUBLICATIONS

Product Bulletin, Presto® 4-Quart Stainless Steel Pressure Cooker, 2009, 2 pages.
Product Bulletin, Presto® 6-Quart Aluminum Pressure Cooker, 2009, 2 pages.
Product Bulletin, Presto® 6-Quart Stainless Steel Pressure Cooker, 2009, 2 pages.
Product Bulletin, Presto® 6-Quart Stainless Steel Pressure Cooker with Colander Cover, 2009, 2 pages.
Product Bulletin, Presto® 8-Quart Aluminum Stainless Steel Pressure Cooker, 2009, 2 pages.
Product Bulletin, Presto® 8-Quart Stainless Steel Pressure Cooker, 2009, 2 pages.

* cited by examiner

TWO-PIECE HANDLE DESIGN FOR PRESSURE COOKER

PRIORITY CLAIM

The present application claims priority to U.S. Provisional Application Ser. No. 61/113,469, filed Nov. 11, 2008, and entitled "TWO-PIECE HANDLE DESIGN FOR PRESSURE COOKER", which is herein incorporated by reference in its entirety.

FIELD OF THE INVENTION

The present invention relates to the field of handle designs for consumer appliances. More specifically, the present invention is directed to a two-piece handle design sharing a common extended coupling nut to increase mounting strength while reducing overall packaging dimensions.

BACKGROUND OF THE INVENTION

Pressure cookers are well known cooking devices that allow for reduced preparation times while maintaining vitamins and minerals within the food to be cooked. Generally, a pressure cooker can include a small amount of added water and the food item to be cooked. The pressure cooker can then be sealed with a cover and placed over a heat source such as, for example, a gas or electric stove burner. The water is eventually heated to boiling wherein the steam is retained within the sealed pressure cooker. The formation and retention of the steam results in an increase to the internal pressure within the pressure cooker. Due to this increased pressure, the boiling temperature of the water increases such as, for example, to about 121° C. at 1 atmosphere. With this increased temperature, the cooking time is reduced while the surrounding steam does not leach the vitamins and minerals from the food item as can occur during traditional boiling.

SUMMARY OF THE INVENTION

The present application relates to an improved pressure cooker design including a two-piece handle design utilizing a common connection point to increase resistance to damage due to over tightening of connecting screws while simultaneously allowing the use of a conventional handle size with a corresponding reduction in overall packaging size. Generally, the two-piece handle design includes a cover base portion and a cover grip portion wherein a pair of nuts are mounted within the cover base portion to receive coupling screws at both ends of the nuts for operably joining the cover and the cover grip portion to the cover base portion. Connection of the cover base portion and the cover allows for capture of an interlock assembly that prevents the development of pressure within the pressure cooker if the cover is incorrectly attached to the pressure cooker or prevents removal of the cover from the pressure cooker when the pressure cooker is pressurized. By providing for a pair of shared nuts within the cover base portion, tightening of the coupling screws provides for continuous metal on metal contact to eliminate potential damage to weaker polymeric materials while allowing a consumer to quickly and easily attach the cover grip portion of the two-piece handle to the cover base portion at a point of use so as to not require packaging that must accommodate the attached dimensions of the cover and two-piece handle.

In one aspect, the present disclosure relates to a two-piece handle design that provides the simultaneous benefits of increased mounting strength with a reduction in overall packaging dimensions.

In another aspect, the present disclosure relates to a method for coupling a handle to a cover assembly that provides increased strength and rigidity to a fully assembled cover assembly.

In yet another aspect, the present disclosure related to a method of reducing packaging dimensions for a pressure cooker by providing a two-piece handle assembly for attachment at a point of use.

The above summary of the various representative embodiments of the invention is not intended to describe each illustrated embodiment or every implementation of the invention. Rather, the embodiments are chosen and described so that others skilled in the art may appreciate and understand the principles and practices of the invention. The figures in the detailed description that follow more particularly exemplify these embodiments.

BRIEF DESCRIPTION OF THE FIGURES

These as well as other objects and advantages of this invention, will be more completely understood and appreciated by referring to the following more detailed description of the presently preferred exemplary embodiments of the invention in conjunction with the accompanying drawings of which.

Figure 1:
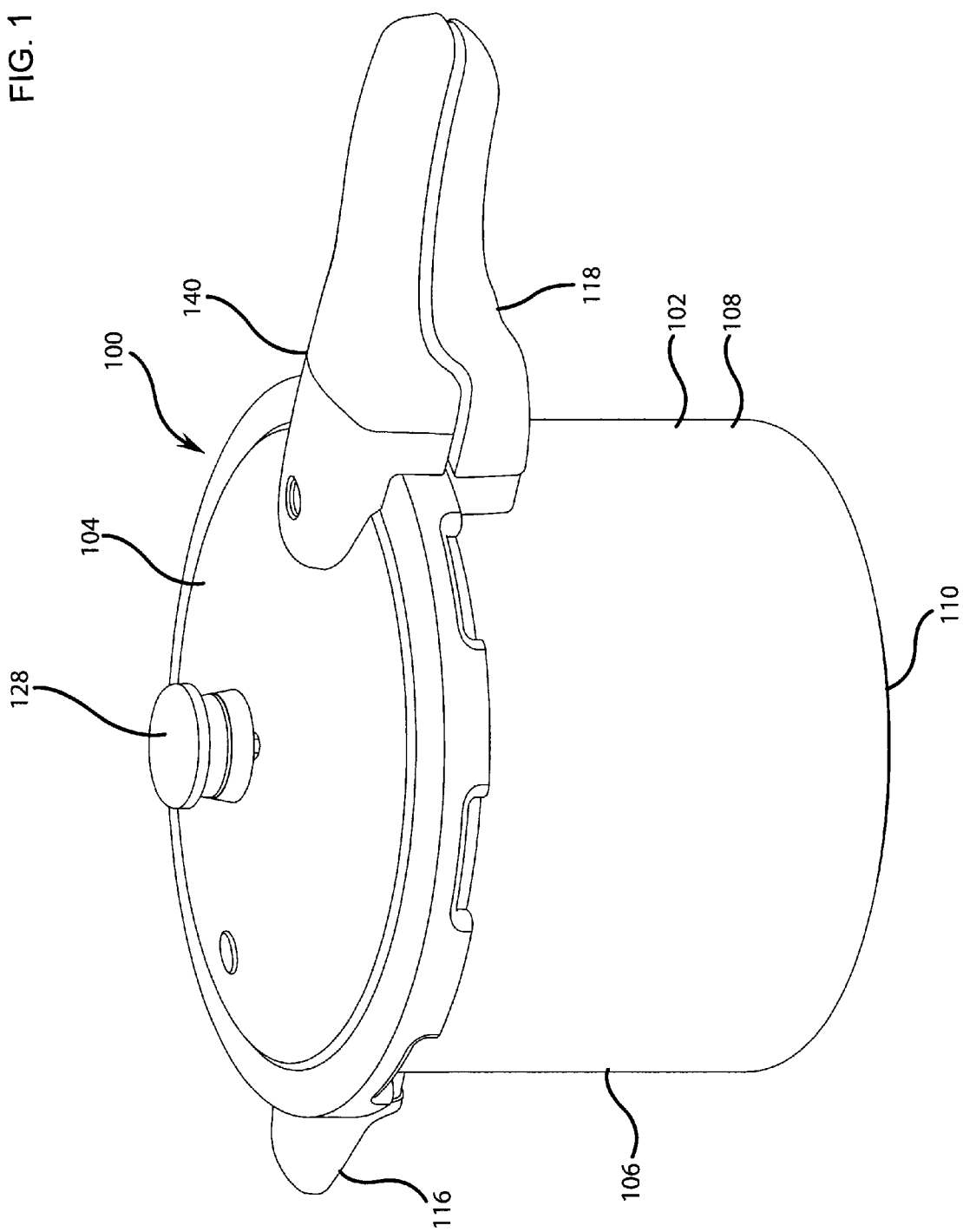
FIG. 1 is a perspective view of a pressure cooker according to an embodiment of the present invention.
Figure 2:
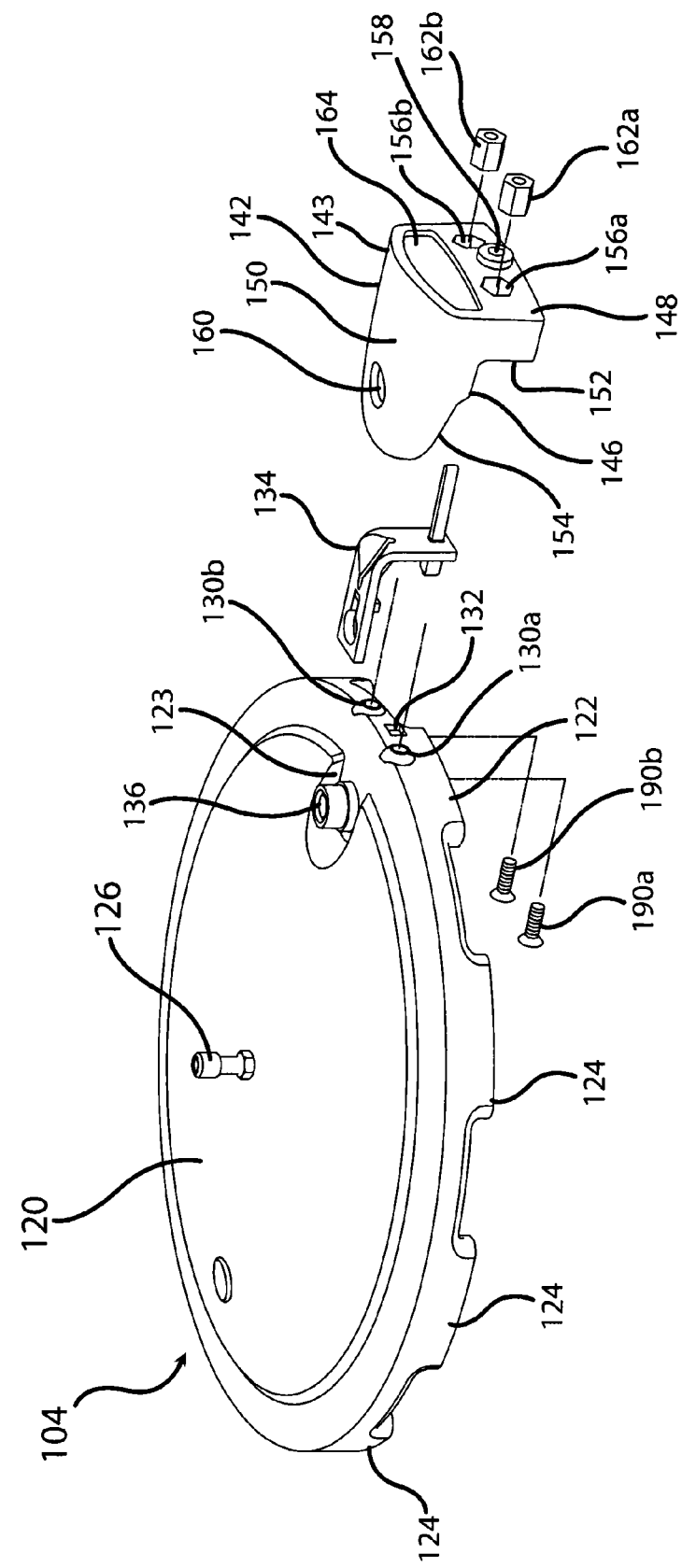
FIG. 2 is an exploded perspective view of a cover assembly according to an embodiment of the present invention.
Figure 3:
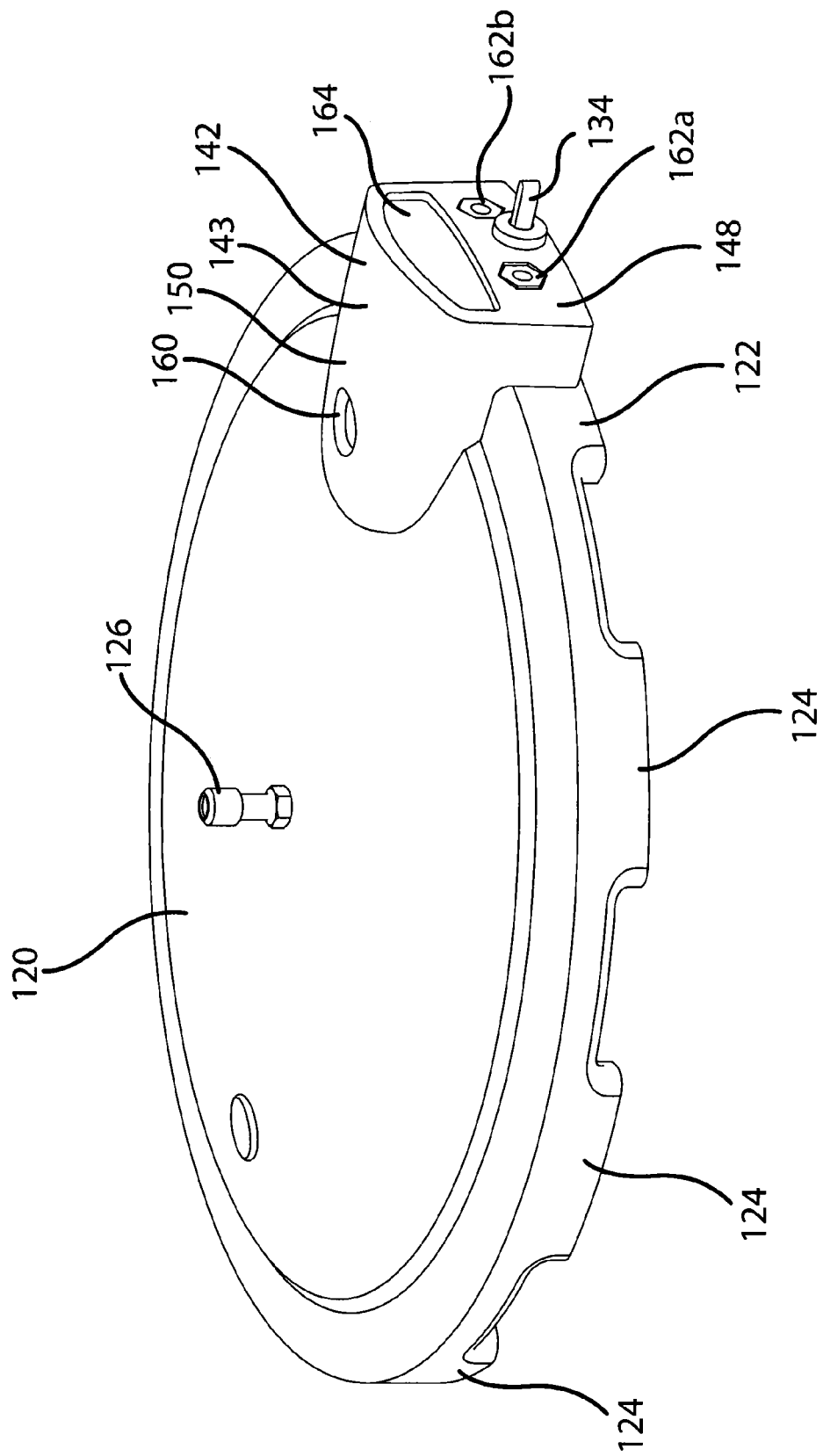
FIG. 3 is a perspective view of the cover assembly of FIG. 2.
Figure 4:
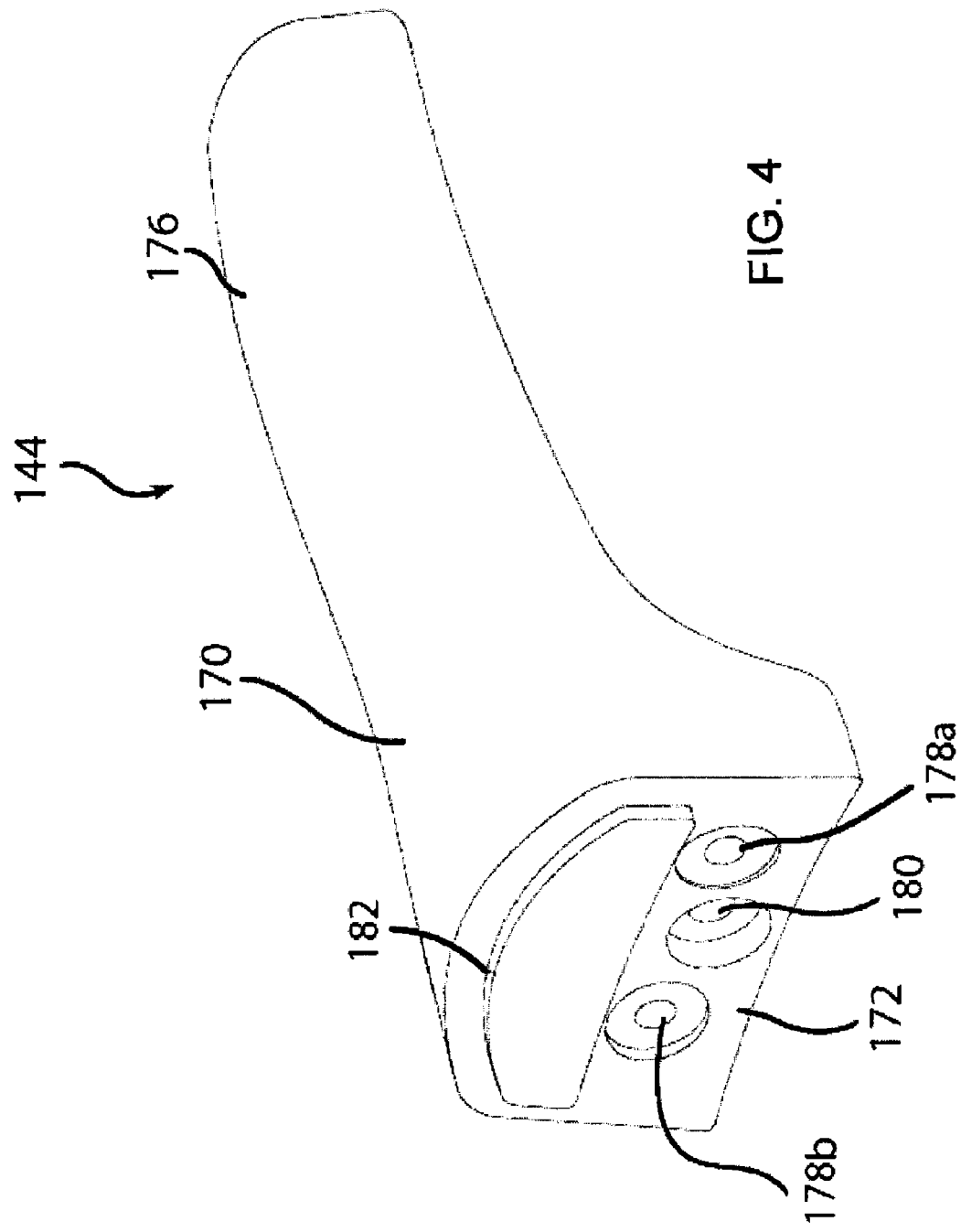
FIG. 4 is a perspective view of a grip portion of a handle assembly.
Figure 5:
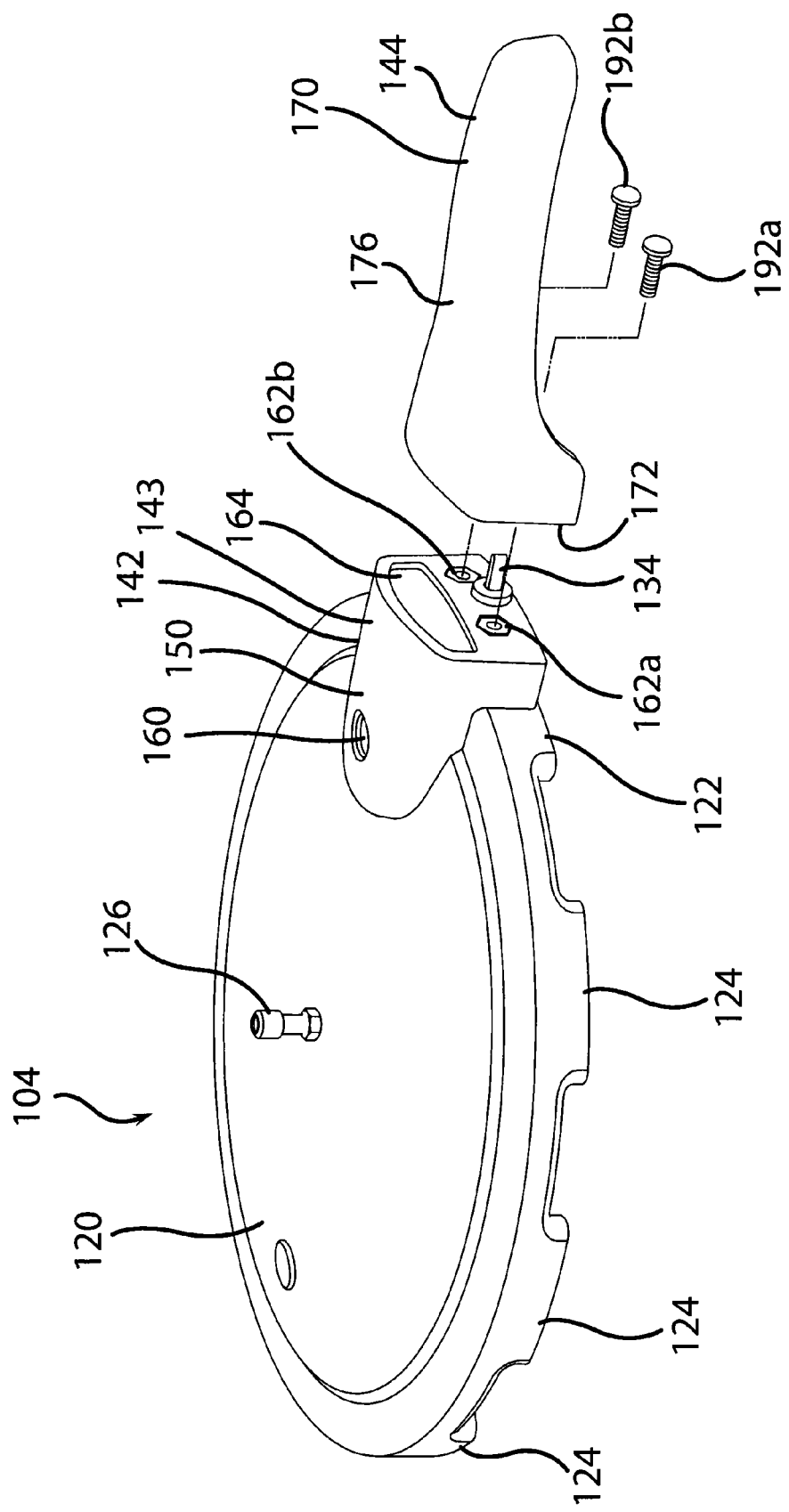
FIG. 5 is an exploded perspective view of the handle assembly according to an embodiment of the present invention prior to attachment to the cover assembly of FIG. 2.
Figure 6:
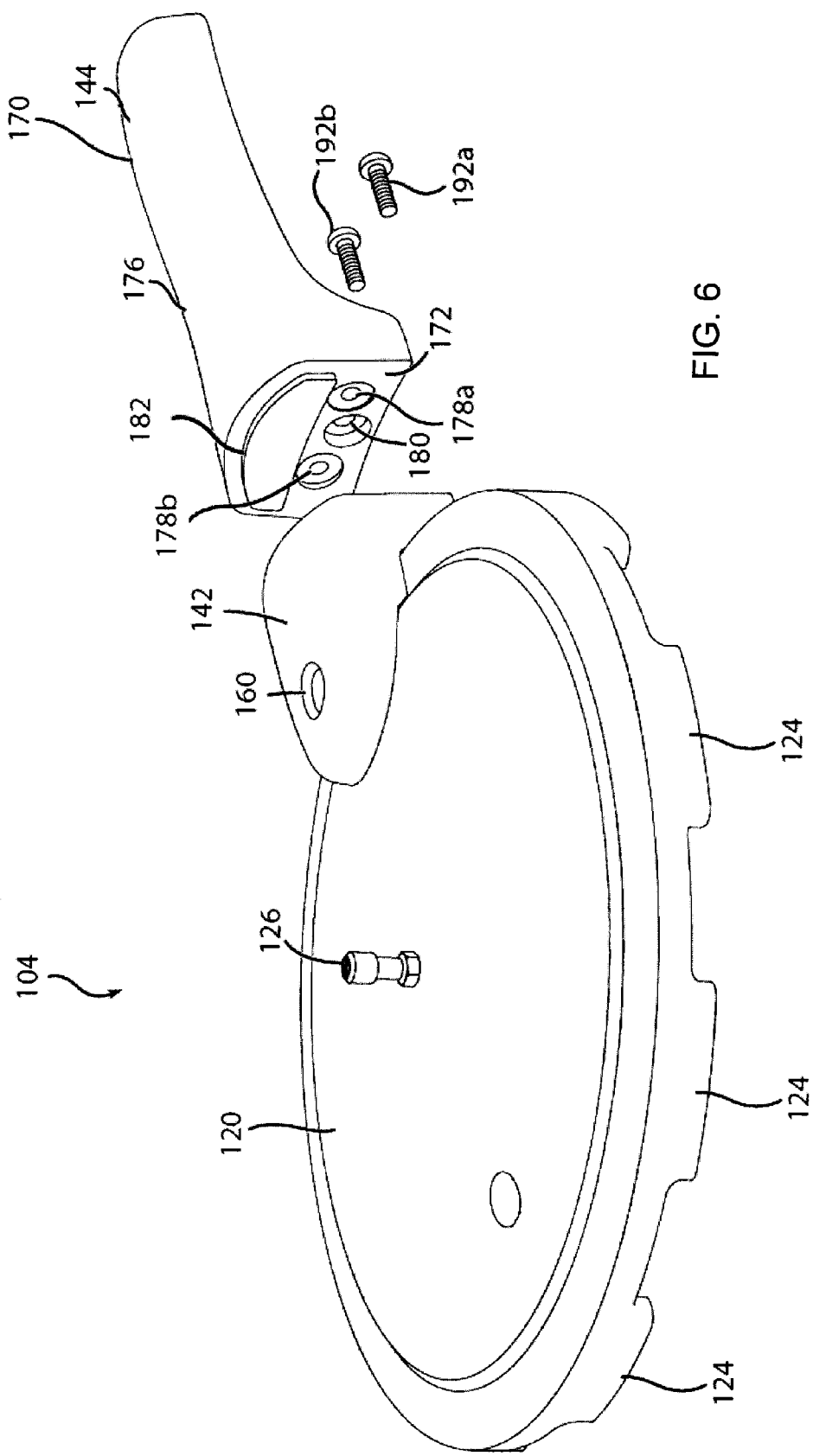
FIG. 6 is an exploded perspective view of the grip portion of the handle assembly according to an embodiment of the present invention prior to attachment to the cover assembly of FIG. 2.
Figure 7:
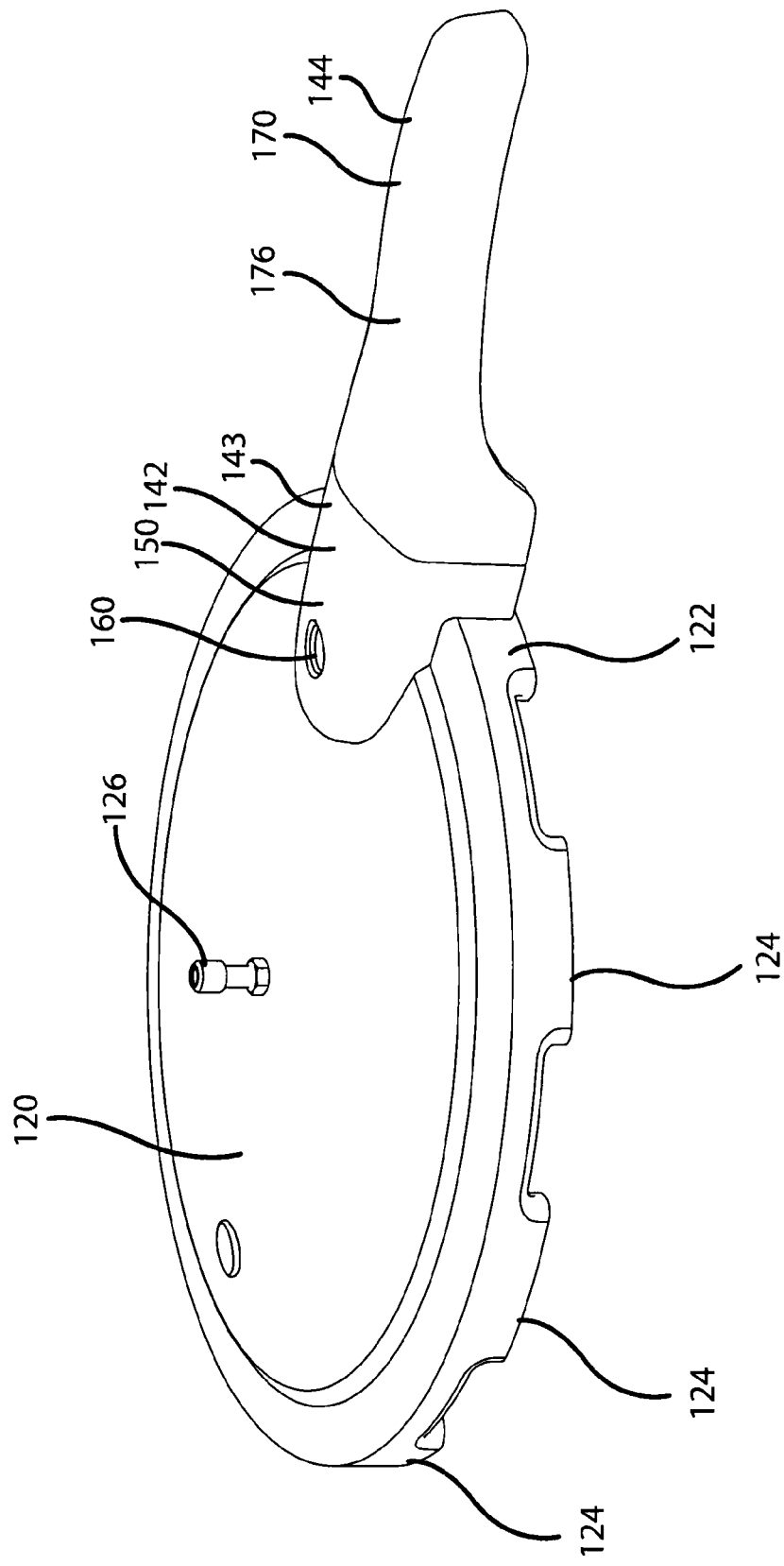
FIG. 7 is a perspective view of the handle assembly attached to the cover assembly of FIG. 2.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents and alternatives.

DETAILED DESCRIPTION OF THE FIGURES

As illustrated in FIG. 1, an embodiment of a pressure cooker 100 generally comprises a cooking pot 102 and a cover assembly 104. Cooking pot 102 and cover assembly 104 generally interlock to define a pressurized vessel 106 for receiving a food product for cooking under conditions above atmospheric pressure. Pressurized vessel 106 is generally designed to operate at an internal pressure of about 1 atmosphere.

Referring again to FIG. 1, cooking pot 102 generally has a perimeter surface 108 and a bottom surface 110. Cooking pot 102 is generally constructed of a material capable of withstanding up to about 1 atmosphere of pressure such as, for example, steel. Though not shown, an upper portion of the cooking pot 102 generally includes a plurality of spaced apart retention tabs. Cooking pot 102 further includes a helper handle 116 and a lower handle portion 118. Helper handle 116 and lower handle portion 118 are generally attached by a consumer following purchase so as to avoid adding to a packaging profile of cooking pot 102.

As illustrated in FIGS. 1-7, cover assembly 104 includes a cover member 120 having a perimeter surface 122, an interlock recess 123 and a plurality of spaced apart locking tabs 124. Cover member 120 includes a relief vent 126 and a relief valve 128 for venting pressure in excess of the design operation pressure of pressurized vessel 106. Perimeter surface 122 includes a pair of attachment apertures 130a, 130b and a slide bore 132. An interlock structure 134 interacts with the slide bore 132 and a pin bore 136 on cover member 120 to prevent pressurization of pressure vessel 106 if the cover assembly 104 is incorrectly attached and to prevent the removal of the cover assembly 104 when the pressure vessel is pressurized. Interlock structure 134 is more fully described and illustrated in U.S. Pat. No. 4,932,150, which is herein incorporated by reference.

Figure 8:
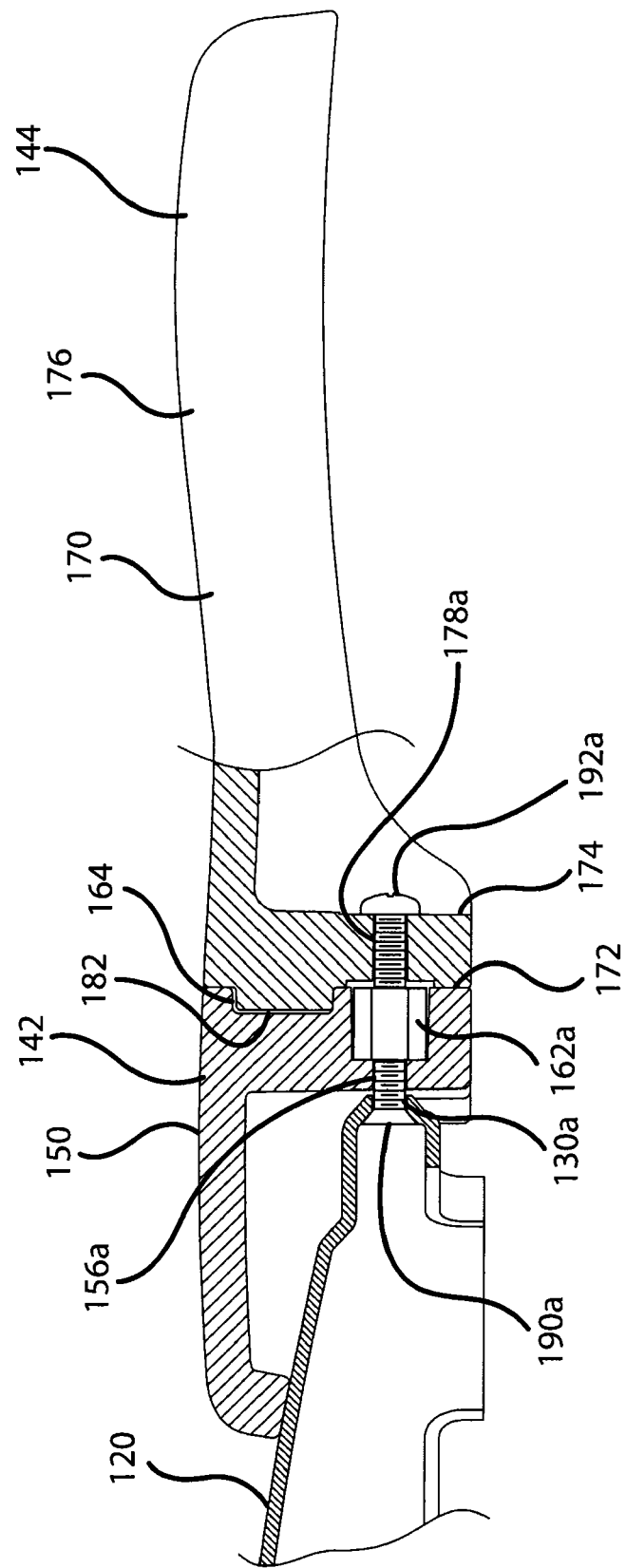
FIG. 8 is a partial section view of the handle assembly attached to the cover assembly.

Referring again to FIGS. 1-7 as well as FIG. 8, cover assembly 104 further comprises a two-piece handle assembly 140. Generally, two-piece handle assembly 140 comprises molded articles formed from a polymeric material that provide rigidity, strength and possess a low thermal conductivity. Two-piece handle assembly 140 generally comprises a cover base portion 142 and a cover grip portion 144.

Cover base portion 142 generally comprises a cover body 143 defined by a cover attachment surface 146, a grip attachment surface 148 and an upper viewable surface 150. Cover attachment surface 146 includes a flanged surface 152 and a contoured surface 154. A pair of cover portion attachment apertures 156a, 156b and a cover portion slide bore 158 continuously extends between the grip attachment surface 148 and the flanged surface 152. An interlock bore 160 extends between the upper viewable surface 150 and the contoured surface 154. Mounted within the cover portion attachment apertures 156a, 156b are a pair of hex nuts 162a, 162b. Grip attachment surface 148 further includes a shaped recess 164.

Cover grip portion 144 generally comprises a grip body 170 having an interface surface 172, an access surface 174 and a grip surface 176. Interface surface 172 is adapted to align with and engage grip attachment surface 148 such that interface surface 172 includes a pair of grip attachment apertures 178a, 178b, a grip slide bore 180 and a shaped projection 182. Grip attachment apertures 178a, 178b extend continuously from the interface surface 172 to the access surface 174.

In order to reduce overall packaging dimensions of the pressure cooker 100, two-piece handle assembly 140 is generally sent in a disassembled arrangement so as to avoid having to include packaging that accommodates the length of cover grip portion 144. Generally, cover base portion 142 is attached to the cover member 120 at the factory to as to insure correct assembly and placement of the interlock structure 134 and the hex nuts 162a, 162b. First, the interlock structure 134 is positioned so as to be received and aligned with slide bore 132 and pin bore 136. Next, the cover base portion 142 is arranged to capture and cover the interlock structure 134 by aligning the flanged surface 152 and contoured surface 154 with the perimeter surface 122 and the interlock recess 123 respectively. When arranged as such, the attachment apertures 130a, 130b and the cover portion attachment apertures 156a, 156b are aligned as well as the slide bore 132 and the cover portion slide bore 158. As such, the interlock structure 134 partially extends through the cover portion slide bore 158. In some instances, the hex nuts 162a, 162b can be permanently affixed or removably placed within the cover portion attachment apertures 156a, 156b. To fix the attachment of the cover base portion 142 to the cover member 120, a pair of machine screws 190a, 190b are inserted through the attachment apertures 130a, 130b and the cover portion attachment apertures 156a, 156b such that threads on the machine screws 190a, 190b engage the threads on the hex nuts 162a, 162b for tightening and retention of the cover base portion 142 to the cover member 120.

Following purchase, cover grip portion 144 can be attached to the cover base portion 142 by positioning the interface surface 172 proximate the grip attachment surface 148. Through insertion of the shaped projection 182 into the corresponding shaped recess 164, alignment of the cover portion attachment apertures 156a, 156b and the grip attachment apertures 178a, 178b (not shown) as well as the cover portion slide bore 158 and grip slide bore 180 is accomplished. The purchaser next inserts machine screws 192a, 192b through the grip attachment apertures 178a, 178b such that the threads on machine screws 192a, 192b engage corresponding threads on the hex nuts 162a, 162b.

Hex nuts 162a, 162b, machine screws 190a, 190b and machine screws 192a, 192b will all generally comprise the same metallic material such as, for example, steel or brass such that tightening of the machine screws 190a, 190b, 192a, 192b will not lead to stresses capable of cracking or otherwise damaging the hex nuts 162a, 162b. In this way, damage caused by over tightening or torquing will not lead to a connection failure as can occur when using connectors of differing materials, especially polymeric materials. In addition, the sharing of hex nuts 162a, 162b by machine screws 190a, 190b, 192a, 192b results in an overall reduction in the size of cover base portion 142 as the cover base portion 142 need only accommodate two hex nuts 162a, 162b as opposed to four hex nuts, one for each of machine screws 190a, 190b, 192a and 192b. By reducing the overall size of cover base portion 142, material costs are reduced and packaging dimensions are decreased.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents.

The invention claimed is:

1. A pressure cooker, comprising:
 a cooking pot; and
 a cover assembly including a handle assembly, the handle assembly having a base portion and a grip portion, the base portion including a hex nut mounted within each of a plurality of base apertures, wherein at least one cover screw is insertable through the cover assembly and into a cover end of each hex nut to join the cover assembly to the base portion and wherein at least one grip screw is insertable through the grip portion and into a grip end of each hex nut to join the grip portion to the base portion.

2. The pressure cooker of claim 1, wherein the cover assembly includes a pair of attachment apertures, and wherein the attachment apertures are aligned with a pair of base apertures for insertion of the cover screws into the cover end of each hex nut.

3. The pressure cooker of claim 2, wherein the grip portion includes a pair of grip apertures, and wherein the grip apertures are aligned with the pair of base apertures for insertion of the grip screws into the grip end of each hex nut.

4. The pressure cooker of claim 1, wherein the base portion is joined to the cover assembly to define a first shipping element and wherein the grip portion defines a second shipping element, wherein the first shipping element and second shipping element are assembled at a point of use.

5. The pressure cooker of claim 1, wherein the hex nuts, the cover screws and the grip screws comprise a metallic material.

6. The pressure cooker of claim 5, wherein the base portion and the grip portion comprise molded polymers.

7. The pressure cooker of claim 1, wherein the base portion defines a grip attachment surface including a shaped recess and wherein the grip portion defines an interface surface having a shaped projection, such that insertion of the shaped projection into the shape recess aligns the base portion and grip portion for joining with the grip screws.

8. The pressure cooker of claim 1, wherein the base portion defines a flanged surface and a contoured surface that interface with a perimeter surface on the cover assembly.

9. The pressure cooker of claim 8, wherein an interlock structure is captured between the base portion and the cover assembly as the base portion and the cover assembly are joined.

* * * * *